United States Patent
Winkler

(10) Patent No.: US 12,460,962 B2
(45) Date of Patent: Nov. 4, 2025

(54) SYSTEMS AND METHODS FOR ELECTRONIC SCALE AUTO-ZEROING

(71) Applicant: Pelstar, LLC, McCook, IL (US)

(72) Inventor: Mark Winkler, McCook, IL (US)

(73) Assignee: Pelstar, LLC, McCook, IL (US)

( * ) Notice: Subject to any disclaimer, the term of this patent is extended or adjusted under 35 U.S.C. 154(b) by 356 days.

(21) Appl. No.: 18/330,664

(22) Filed: Jun. 7, 2023

(65) Prior Publication Data

US 2023/0400347 A1 Dec. 14, 2023

Related U.S. Application Data

(60) Provisional application No. 63/350,261, filed on Jun. 8, 2022.

(51) Int. Cl.
| | | |
|---|---|---|
| *G01G 23/01* | (2006.01) | |
| *G01G 3/12* | (2006.01) | |
| *G01G 19/44* | (2006.01) | |
| *G01G 23/32* | (2006.01) | |

(52) U.S. Cl.
CPC .............. *G01G 23/01* (2013.01); *G01G 3/12* (2013.01); *G01G 23/32* (2013.01); *G01G 19/44* (2013.01)

(58) Field of Classification Search
CPC .......... G01G 23/01; G01G 3/12; G01G 23/32; G01G 23/16; G01G 19/44
USPC .......................................................... 177/50
See application file for complete search history.

(56) References Cited

U.S. PATENT DOCUMENTS

| | | | | |
|---|---|---|---|---|
| 5,177,697 | A * | 1/1993 | Schanen ............. | H03M 1/1019 341/120 |
| 7,511,645 | B1 * | 3/2009 | Ranucci .............. | H03M 1/1019 341/120 |
| 7,550,682 | B2 | 6/2009 | Lawler et al. | |
| 7,872,201 | B1 * | 1/2011 | Whitney ................ | G01G 23/38 702/101 |
| 11,354,393 | B2 * | 6/2022 | Winkler ................. | G06F 21/31 |
| 2016/0327426 | A1 * | 11/2016 | Nachtigal ............. | A61G 7/0527 |

* cited by examiner

*Primary Examiner* — Jacques M Saint Surin
(74) *Attorney, Agent, or Firm* — Michael Best & Friedrich LLP

(57) ABSTRACT

Systems and methods for electronic scale auto-zeroing. One example system includes a load cell coupled to a platform of the scale and an electronic processor coupled to the load cell. The processor is configured to receive an activation command activating the scale and, responsive to receiving the command, initiate a powerup zeroing function. The processor is configured to receive, from the load cell, a first signal indicative of a force applied to the platform and, responsive to receiving the first signal, determine whether the force applied to the platform of the scale exceeds a threshold. The processor is configured to, responsive to determining that the force exceeds the threshold: cancel the powerup zeroing function, and calculate a weight based on the first signal. The processor is configured to, responsive to determining that the force does not exceed the threshold, complete the powerup zeroing function.

22 Claims, 4 Drawing Sheets

SYSTEMS AND METHODS FOR ELECTRONIC SCALE AUTO-ZEROING

CROSS REFERENCE TO RELATED APPLICATION

The present application is related to and claims priority to U.S. Provisional Patent Application Ser. No. 63/350,261, filed Jun. 8, 2022, the entire contents of which are hereby incorporated by reference.

FIELD

The present application relates to systems and methods for controlling the auto zero functions of electronic scales, more particularly, those of medical scales.

SUMMARY

In general, scales are expected to measure weight both accurately and with precision. The importance of accurate and repeatable readings may be more significant depending on the particular application. For example, medical scales are used in healthcare environments to measure the weight of a patient. A patient's weight can provide important or useful information to, for example, detect fluid retention, calculate proper medication dosages, screen for malnutrition, etc. Therefore, it is desirable for medical scales to provide accurate and precise weight measurements to healthcare professionals and other users.

Modern electronic scales measure weight using load cells, which produce voltages proportional to the force applied to the load cells by an object being weighed. The voltage reading of when no force is being applied to the load cell is the zero point for the load cell. However, the zero point may not be zero volts. Individual load cells, or arrays of load cells, may register slight negative or positive voltage values at their zero points. To account for this, a scale's controller will record the zero point value for its load cell and subtract this zero point value from a voltage reading from the load cell before using the voltage reading to calculate a weight.

However, over time, certain environmental changes surrounding the scale may impact the zero point of the load cell. For example, temperature changes, humidity, accumulation of foreign matter such as dust, and repositioning/relocation of the scale may all cause the zero point of the load cell to change. If the actual zero point of the load cell has changed, but the scale calculates weight assuming the old value, the scale's accuracy and precision are reduced. Accordingly, some scales include a zeroing function to reset the zero point of the scale to take into account the changes. The zeroing function, when executed, reads the voltage of the load cell while no weight is applied to the scale and sets the load cell zero point to this voltage.

In some scales, the zeroing function may be executed via a user input. However, in scales where the user manually activates the zeroing function, a previously stored zero point is used until the zeroing is performed again. Infrequent manual zeroing may thus result in inaccurate and imprecise measurements in cases where the actual zero point voltage value has changed since the zero point was last recorded. To address this, some scales are configured to automatically perform zeroing on powerup (that is, to perform the zeroing function upon each time the scale is powered on or wakes from a sleep mode). However, this configuration has disadvantages. For example, each time the scale is powered up, the operator of the scale must wait before using the scale to measure a weight. This is inefficient in situations where accuracy and repeatability are less important than speedily obtaining weight measurements. In another example, a user may activate the scale while a load (e.g., an object) is on the scale, causing the zeroing function to record an incorrect zero point, rendering future weight measurements inaccurate. Accordingly, embodiments presented herein provide, among other things, scales configured to automatically override zeroing on powerup.

In one example embodiment, a system for controlling a scale is provided. The system includes a load cell coupled to a platform of the scale and an electronic processor coupled to the load cell. The electronic processor is configured to receive an activation command activating the scale and, responsive to receiving the activation command, initiate a powerup zeroing function for the scale. The electronic processor is configured to receive, from the load cell, a first signal indicative of a force applied to the platform of the scale. The electronic processor is configured to, responsive to receiving the first signal, determine whether the force applied to the platform of the scale exceeds a threshold. The electronic processor is configured to, responsive to determining that the force exceeds the threshold: cancel the powerup zeroing function and calculate a weight based on the first signal. The electronic processor is configured to, responsive to determining that the force does not exceed the threshold, complete the powerup zeroing function.

In another example embodiment, a method for controlling a scale is provided. The method includes receiving an activation command activating the scale. The method includes, responsive to receiving the activation command, initiating a powerup zeroing function. The method includes receiving, from a load cell of the scale, a first signal indicative of a force applied to a platform of the scale. The method includes, responsive to receiving the first signal, determining whether the force applied to the platform of the scale exceeds a threshold. The method incudes, responsive to determining that the force exceeds the threshold: cancelling the powerup zeroing function and calculating a weight based on the first signal.

In such embodiments, electronic scales are configured to maintain both accuracy and precision, and to provide for quick convenient use of the scale as needed. Using such embodiments, accuracy and precision are maintained through zeroing on powerup, while convenience is maintained by overriding the zeroing function if weight is applied to the scale.

In some instances, scales may remain powered up for long periods of time, preventing the zeroing on powerup function from executing. In other instances, scales may not be configured to perform zeroing on powerup. These situations can lead to inaccurate and imprecise measurements due to undetected and uncompensated for zero point drift. Accordingly, embodiments presented herein provide, among other things, scales configured to detect and correct zero point drift over time.

In another example embodiment, an electronic scale is provided. The electronic scale includes a memory, a load cell coupled to a platform of the scale, and an electronic processor coupled to the memory and the load cell. The electronic processor is configured to retrieve a voltage value from the load cell. The electronic processor is configured to retrieve, from the memory, a previously stored zero point value for the load cell. The electronic processor is configured to compare the voltage value to the previously stored zero point value. The electronic processor is configured to, responsive to determining that the voltage value differs from the previously stored zero point value by more than a drift threshold, increment a drift counter. The electronic processor is configured to responsive to determining that the drift counter exceeds a threshold value, set the zero point value for the load cell based on the voltage value.

Using such embodiments, scales are able to detect and compensate for zero point drift automatically, regardless of how often they are powered up.

Other independent aspects of the invention may become apparent by consideration of the detailed description and accompanying drawings.

DETAILED DESCRIPTION

Figure 1:
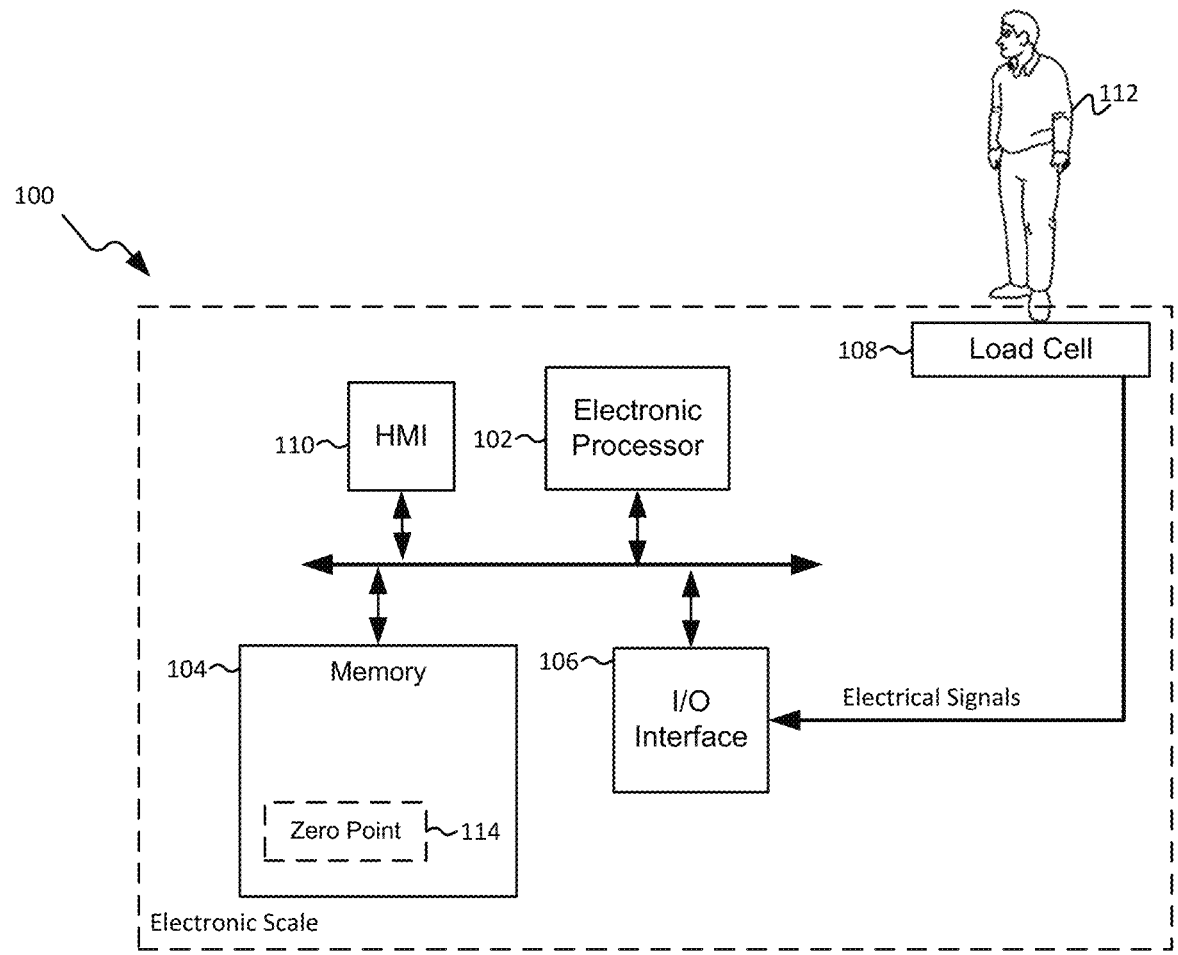
FIG. 1 is a block diagram of a scale, according to some example embodiments.

Before any independent embodiments are explained in detail, it is to be understood that the embodiments presented herein are not limited in their application to the details of construction and the arrangement of components set forth in the following description or illustrated in the following drawings. The independent embodiments presented herein are capable of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an exemplary independent embodiment of a scale 100 (e.g., a medical scale) used to measure the weight of a person 112. Although illustrated as measuring the weight of a person, the scale 100 may also be used to measure the weight of objects or animals. The scale 100 may include various digital and analog components, which for brevity are not described herein and which may be implemented in hardware, software, or a combination of both. Components of the scale 100 may be similar to the components illustrated and described in U.S. Pat. No. 7,550,682, issued Jun. 23, 2009, the entire contents of which are hereby incorporated by reference.

The scale 100 includes an electronic processor 102, a memory 104, an input/output interface 106, a load cell 108, and a human machine interface (HMI) 110. The illustrated components, along with other various modules and components, are coupled to each other by or through one or more control or data buses that enable communication therebetween. The use of control and data buses for the interconnection between and exchange of information among the various modules and components would be apparent to a person skilled in the art in view of the description provided herein.

Figure 2A:
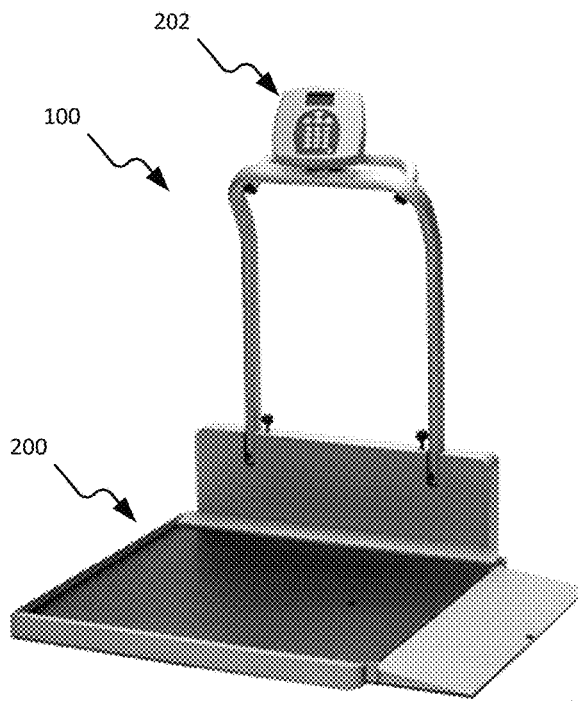
FIGS. 2A-2C depict example embodiments of the scale of FIG. 1.
Figure 2B:
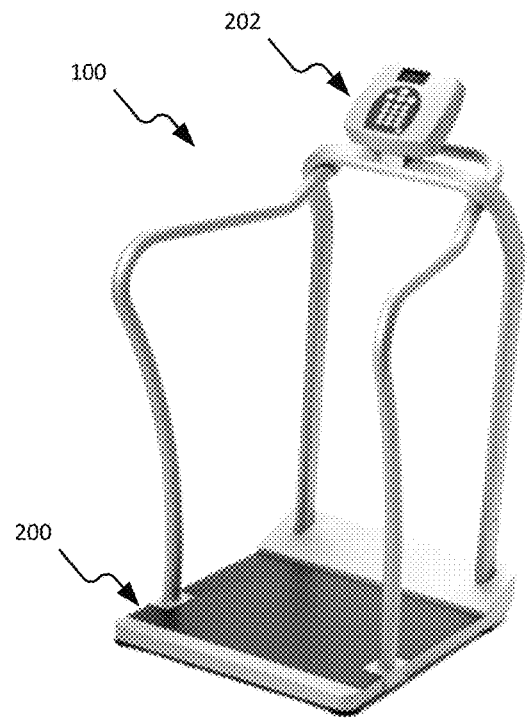
Figure 2C:
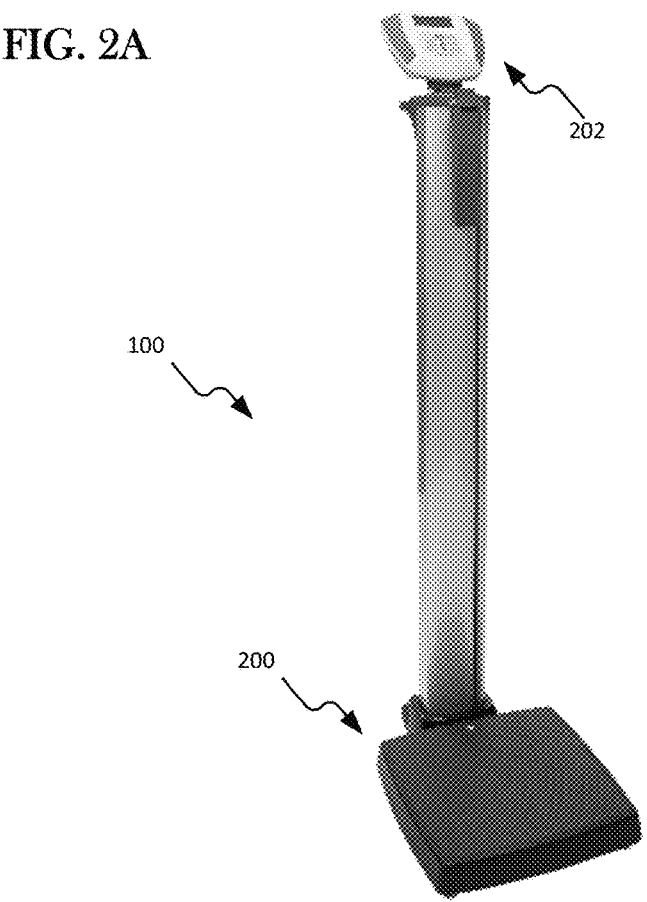

FIGS. 2A-2C illustrate example constructions of the scale 100. As shown in FIG. 2A, the person 112 may be positioned on a platform 200 of the scale 100, and the weight of the person is displayed on a display of a head unit 202. The illustrated head unit 202 includes a housing containing, among other things, the electronic processor 102, the memory 104, the input/output interface 106, and the HMI 110. In some embodiments, the head unit 202 is removable from the scale 100. In some constructions (not shown), the head unit 202 is not attached directly to the scale 100. The load cell 108 is operably coupled to the platform 200 to determine the weight of a person, object, or animal on the platform 200 and connected to the head unit 202 via a wired or wireless connection (not shown).

Returning to FIG. 1, the processor 102 obtains and provides information, for example, to and from the memory 104, the input/output interface 106, the load cell 108, and the HMI 110, and processes the information by executing one or more software instructions or modules, capable of being stored, for example, in a random access memory ("RAM") area of the memory 104 or a read only memory ("ROM") of the memory 104 or another non-transitory computer readable medium (not shown). The software can include firmware, one or more applications, program data, filters, rules, one or more program modules, and other executable instructions. The processor 102 is configured to retrieve from the memory 104 and execute, among other things, software related to the control processes and methods described herein.

The memory 104 can include one or more non-transitory computer-readable media and includes a program storage area and a data storage area. The program storage area and the data storage area can include combinations of different types of memory, as described herein. In the embodiment illustrated, the memory 104 stores, among other things, a zero point value 114. The zero point value 114, in particular, includes previously acquired voltage measurements for the load cell 108, collected during a zeroing function (as described herein) implemented by the scale 100. In some embodiments, the zero point value 114 is stored in a non-volatile random-access memory (NVRAM) of the memory 104.

The input/output interface 106 is configured to receive input and to provide output to peripherals. The input/output interface 106 obtains information and signals from, and provides information and signals to, (e.g., over one or more wired and/or wireless connections) devices both internal and external to the scale 100. For example, in some embodiments, the load cell 108 provides electrical signals to the processor 102 via the input/output interface 106.

In some embodiments, the input/output interface 106 (or portions thereof) is integrated with the processor 102. In some embodiments, the input/output interface 106 includes ports for connecting to wired connections.

As mentioned above, the scale 100 is used to measure the weight of a person 112 (or of an object or animal placed on the platform of the scale). In the example illustrated, the person 112 stands on a platform 200 (See FIG. 2), which exerts the force of the person's weight on the load cell 108. The load cell 108 includes a transducer, which converts a force (e.g., compression) applied to the load cell into an electrical signal (e.g., a voltage), which changes proportionately to the force applied to the load cell. In some embodiments, the scale 100 includes an array of two of more load cells coupled to the platform. In such embodiments, the array of transducers may be electrically coupled (e.g., by a Wheatstone bridge) to output a single voltage signal. The processor 102 is configured to process the signals to calculate a weight for the user 112. To calculate the person's weight, the processor 102 reads a voltage value (e.g., in millivolts) from the load cell, subtracts the zero point value 114 from the voltage value, and multiplies the result by a calibration value, which represents a quantity of weight per quantity of voltage (e.g., expressed as grams per millivolt). The calculated weight is displayed on the HMI 110 of the scale. In some embodiments, the scale 100 is configured to provide the measured weight to another electronic device (e.g., a mobile computing device connected to the scale 100 via a wireless data connection).

In some embodiments the processor 102 is also configured to perform a powerup zeroing function. The powerup zeroing function sets the zero point value 114 for the load cell 108 when the scale powers on (e.g., a transition from an off mode to an on mode) or wakes up (e.g., a transition from a sleep/standby/power-saving mode to a ready/on mode). The powerup zeroing function is an automatically zeroes the scale 100. The processor 102, when powerup is initiated, reads a voltage value from the load cell 108, and stored the voltage value in the memory 104 as a zero point value 114 for the load cell 108.

The HMI 110 receives input from, and provides output to, users of the scale 100. The HMI 110 may include a keypad, switches, buttons, soft keys, indictor lights (e.g., light emitting diodes (LEDs), haptic vibrators, etc.). In some embodiments, the HMI 110 includes a suitable display, for example, a liquid crystal display (LCD) screen, an organic light-emitting diode (OLED) screen, etc. In some embodiments, the display is a touch screen display.

In some embodiments, the scale 100 implements a graphical user interface (GUI) (e.g., generated by the processor 102, from instructions and data stored in the memory 104, and presented on the display of the HMI 110) enabling a user to interact with and control the scale 100, including the user terminal. In some embodiments, the HMI 110 presents a menu system for configuring and interacting with the scale 100.

In some embodiments, one or more components of the HMI 110 are separate from the head unit 202 and are communicatively coupled with the head unit 202 (e.g., via the input/output interface 106 using a wired or wireless connection). For example, in some embodiments, the HMI 110 may include a keypad and a display disposed in a separate hardware module, which is coupled to the head unit 202 (e.g., via a wired connection to the input/output interface 106).

In some embodiments, one or more components of the HMI 110 may be presented virtually on another electronic device, which is in communication with the head unit 202. For example, a smart telephone or other computing device may include an application, which presents a virtual display and keypad (or other input means). In some embodiments, a combination of approaches is used. For example, a display may be integrated into the head unit 202, while a separate keypad may be attached for menu navigation and configuration of the scale. In some embodiments, access to some functions of the head unit 202 is restricted to either an integrated HMI 110 or a remote HMI 110. For example, certain menu functions may only be accessible using a remote HMI 110.

As noted above, the processor 102 implements software to allow users to operate the scale 100. In some embodiments, the software includes functions pertaining to one or more settings/operational features of the scale 100. For example, one function may provide enabling/disabling a setting of the scale 100 to automatically perform the powerup zeroing function, described in more detail below, upon powering up from an off mode and/or waking up from a sleep mode.

Figure 3:
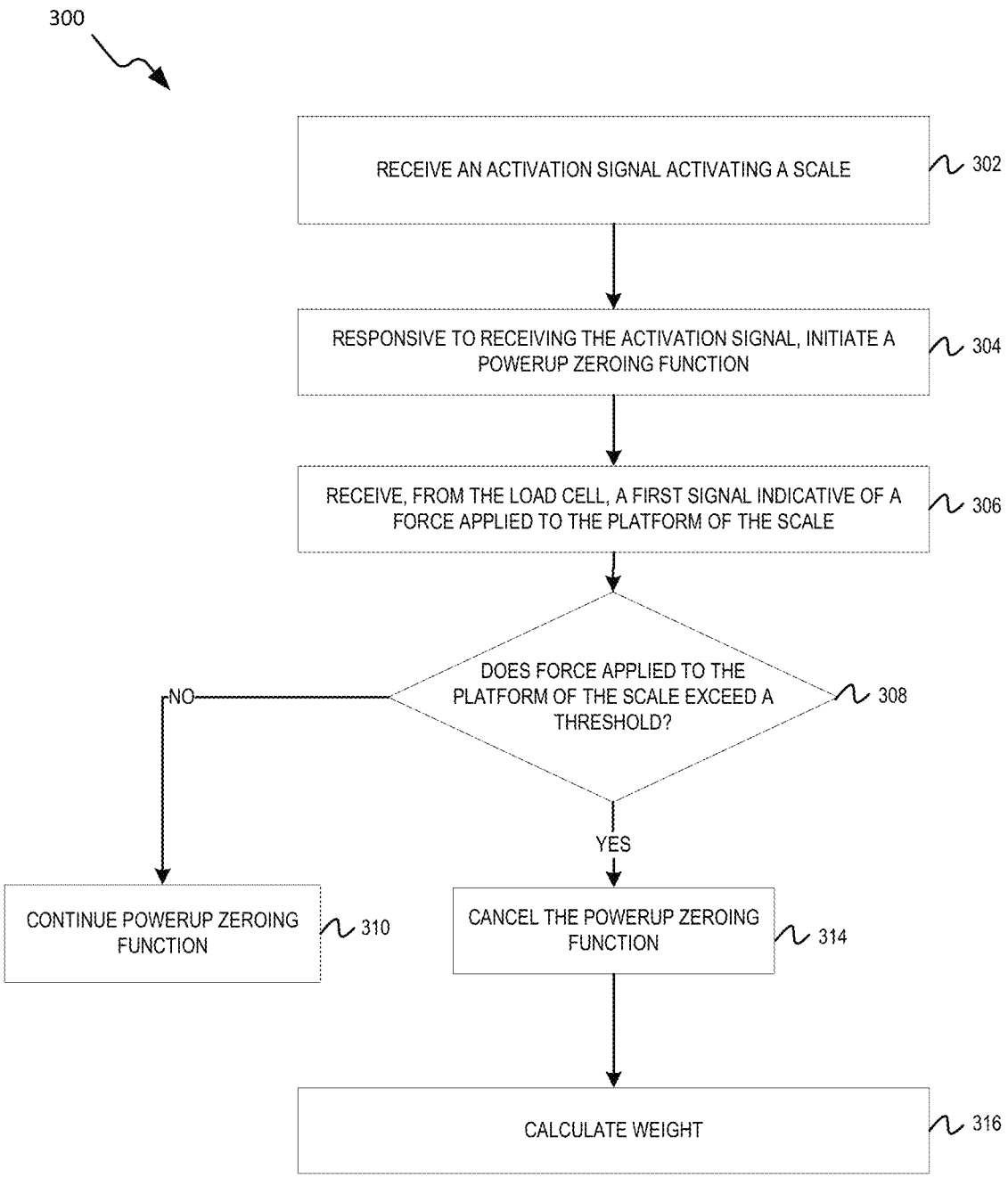
FIG. 3 is a flowchart illustrating a method of operating the scale of FIG. 1 according to some embodiments.

FIG. 3 illustrates an example method 300 for implementing a powerup zeroing function. As an example, the method 300 is described as being performed by the scale 100 and, in particular, the electronic processor 102.

At block 302, the electronic processor 102 receives, an activation command activating the scale 100. In some embodiments, the activation of the scale 100 includes powering on the scale 100 from an off mode and/or waking the scale 100 from a sleep mode. For example, the activation command may be generated in response to a user input via the HMI 110 (e.g., the selection of an "On" button on the HMI 110).

At block 304, the electronic processor 102, responsive to receiving the activation command, initiates a powerup zeroing function. As generally described above, a zeroing function zeros the scale 100 by reading and storing a voltage value.

As illustrated in FIG. 3, before the powerup zeroing function proceeds, the scale 100 determines whether a weight is being applied to the scale. At block 306, the electronic processor 102 receives from the load cell 108, a first signal indicative of a force applied to a platform (e.g., the platform 200 coupled to the load cell 108) of the scale 100. The electronic processor 102, responsive to receiving the first signal, determines whether the force applied to the platform 200 of the scale 100 exceeds a threshold (block 308). For example, the electronic processor 102 may compare the voltage value of the first signal to a threshold voltage value representing a particular weight (e.g., ten pounds). In another example, the electronic processor may convert the first signal into a weight, as described herein, and compare the weight to a threshold weight (e.g., ten pounds). The threshold value may be predetermined by the scale manufacturer. In some embodiments, the threshold value may be user programmable, to account for specifics of the user operating environment for the scale. In some embodiments, determining whether the force exceeds the threshold includes determining whether the force exceeds a threshold for a predetermined period of time (e.g., one second). This may be done, for example, to avoid false cancellations (described with regard to block 314).

When the electronic processor 102 determines (at block 308) that the force does not exceed the threshold, the electronic processor 102, at block 310, continues performing the powerup zeroing function. In some embodiments, continuing to perform the powerup zeroing function includes writing the voltage value for the first signal to the memory 104, replacing the current zero point value 114. In some embodiments, continuing to perform the powerup zeroing function includes receiving another signal from the load cell and writing the voltage value for that signal to the memory 104, replacing the current zero point value 114. In some embodiments, several voltage values are received over a period of time (e.g., receiving three values during a two second period) and a mean or median of the values is used to replace the current zero point value 114.

When the electronic processor 102 determines (at block 308) that the force exceeds the threshold, the electronic processor 102, at block 314, responsive to determining that the force exceeds the threshold, cancels the powerup zeroing function and calculates a weight applied to the platform 200 (block 316) based on the first signal received from the load cell 108 and the current zero point value 114 (e.g., retrieved from the memory 104).

In some embodiments, the steps of the method 300 are integrated into the zeroing function, which may exit or abort upon determining that the force exceeds the threshold. In some embodiments, the zeroing function may be a software routine called by a main control program, which simply does not call the routine responsive to determining that the force exceeds the threshold.

In some embodiments, the electronic processor 102 is further configured to display, via the HMI 110 (e.g., via a display, an LED, or the like), a zeroing override indication. In some embodiments, the zeroing override indication provides an indication to a user of the device that the powerup zeroing function was not performed. The override indication may be a text-based display, an indicator light, an audible alert, and the like.

In some embodiments, whether the powerup zeroing function is cancelled (at block 314) is based further on a user configurable setting. For example, the electronic processor 102, in some embodiments, is configured to check whether an auto-zero override flag (e.g., as stored in the memory 104) is set and only cancels the zeroing function in response to both the force exceeding the threshold and the auto-zero override flag being set. The auto-zero override flag, in some embodiments, may be set by a user of the scale (e.g., via a configuration menu presented by the HMI 110.

In some embodiments, the electronic processor 102 is configured to check for errors (e.g., detecting a bad load cell, detecting an object left on the platform, and the like). In one example, the electronic processor 102, responsive to determining that the force does not exceed the threshold (at block 308), determines whether the force applied to the platform of the scale exceeds an error threshold. For example, the electronic processor 102 may compare the voltage value of the first signal to an error threshold voltage value representing a particular weight. In some aspects, the error threshold voltage value is set lower than the threshold voltage value such that it represents a variance (from the current zero point value) large enough to indicate weight from, for example, on object mistakenly left on the platform. In some aspects, the error threshold voltage value is set lower than the threshold voltage value such that it represents a variance (from the current zero point value) large enough to indicate that the load cell is no longer within an acceptable tolerance of the current zero point value. In another example, the electronic processor 102 may convert the first signal into a weight, as described herein, and compare the weight to an error threshold weight. The error threshold value may be predetermined by the scale manufacturer (e.g., based on specifications for the load cell). In some aspects, the threshold value may be user programmable, to account for specifics of the user operating environment for the scale. In some embodiments, determining whether the force exceeds the threshold includes determining whether the force exceeds the error threshold for a predetermined period of time (e.g., more than two seconds). This may be done, for example, to avoid false error determinations. In some embodiments, the electronic processor 102 is configured to check the load cell reading against the error threshold at times other than startup (e.g., periodically) to check for errors with the load cell or objects left on the platform.

The electronic processor 102 is configured to, responsive to determining that the force exceeds the error threshold, display, via the HMI 110 (e.g., via a display, an LED, or the like), an error indication. The error indication may be a text-based display, an indicator light, an audible alert, and the like. For example, a text-based display may display a message stating "ERROR: CHECK FOR OBJECT LEFT ON PLATFORM" or "ERROR: CHECK FOR DEFECTIVE LOAD CELL."

In some aspects, the electronic processor 102 is configured to, responsive to determining that the force exceeds the error threshold, cancel the powerup zeroing function, as described herein.

Figure 4:
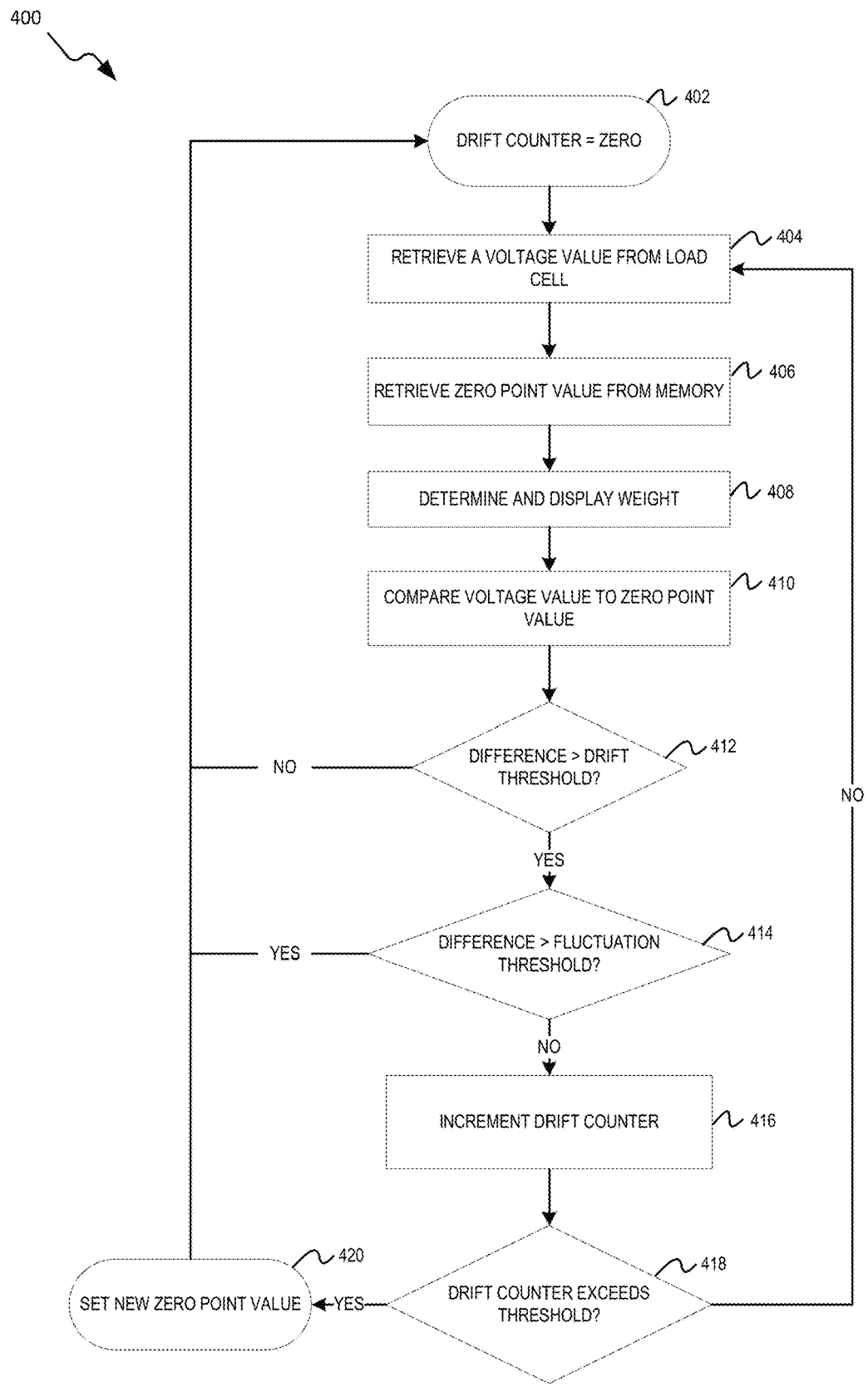
FIG. 4 is a flowchart illustrating a method of operating the scale of FIG. 1 according to some embodiments.

FIG. 4 illustrates an example method 400 for implementing an anti-drift zeroing function. As an example, the method 400 is described as being performed by the scale 100 and, in particular, the electronic processor 102.

At block 402, the electronic processor 102 sets a drift counter to zero. In one example, the drift counter is stored in the memory 104 as a variable. In some embodiments, the drift counter may be stored persistently in flash memory or other non-volatile memory.

At block 404, the electronic processor 102 retrieves a voltage value from the load cell 108, as described herein. At block 406, the electronic processor 102 retrieves the current zero point value 114 from the memory 104. At block 408, the electronic processor 102 calculates a weight using the retrieved voltage value and the retrieved zero point value, as described herein, and displays the weight on the HMI.

At block 410, the electronic processor 102 compares the voltage value (retrieved at block 404) to the zero point value 114 to determine whether the difference exceeds a drift threshold. A drift threshold is a voltage value, which represents the maximum tolerable difference between the zero point value 114 and the current reading from the load cell. The drift threshold may represent, for example, a voltage difference that indicates that the zero point voltage for the load cell has changed, as opposed to experiencing an expected variance.

When the difference does not exceed the drift threshold (at block 412), the drift counter remains at zero (at block 402) and the electronic processor 102 continues retrieving voltage values and displaying weights using the present zero point value, at blocks 404-410.

In some embodiments, when the difference exceeds the drift threshold (at block 412), the electronic processor 102 compares the difference against a fluctuation threshold. A fluctuation threshold is a voltage value, beyond which the voltage difference is likely to be caused by a condition other than drift in the load cells. For example, the scale 100 may be tipped on its side for movement, causing the platform to unload significantly. In another example, people or objects (e.g., pans, chairs, blankets, and the like) may be present on or may have been recently placed on or removed from the scale, causing relatively large swings in the voltage readings. When the difference exceeds the fluctuation threshold (at block 414), the drift counter remains at zero (at block 402) and the electronic processor 102 continues retrieving voltage values and displaying weights using the present zero point value, at blocks 404-410.

When the difference does not exceed the fluctuation threshold (at block 414), the electronic processor 102 increments the drift threshold to indicate that the voltage value exceeds the current zero point value 114 beyond an amount, which is normally expected (but below an amount that could be accounted for by the conditions described with respect to the fluctuation threshold).

As illustrated in FIG. 4, in some embodiments, a single value exceeding the drift threshold may not be enough to trigger a re-zeroing. As illustrated, in such embodiments, when the drift counter does not exceed a threshold value (at block 418), the drift counter is not reset to zero and the electronic processor 102 continues retrieving voltage values and displaying weights using the present zero point value 114 (while also continuing to evaluate the voltage values for drift), at blocks 404-414. As noted herein, in some embodiments, the threshold value for the drift counter is 3, although other values are possible. When the drift counter exceeds the threshold (at block 418), the electronic processor 102, at block 420, sets a new zero point value, as described herein. In some embodiments, the zero point value 114 is set to the voltage value retrieved at block 404. As illustrated in FIG. 4, when the electronic processor 102 sets a new zero point value, the method 400 resumes by setting the drift counter to zero.

As illustrated in FIG. 4, in some embodiments, the method 400 operates continually while the scale is in operation to collect and analyze voltage values to check for drift.

In some embodiments, the method 400 operates to prevent scale drift during a drift interval period. A drift interval period represents a time period during which voltage values for the load cell are checked. In such embodiments, when a threshold number of voltage values differ from the previously set zero point value 114 during a drift interval, then a re-zeroing process is triggered. In some embodiments, the electronic processor 102 may set a drift interval timer before or at the same time as the drift counter is set to zero.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

One or more independent features and/or independent advantages of some embodiments may be set forth in the following claims:

What is claimed is:

1. A system for controlling a scale, the system comprising:
a load cell coupled to a platform of the scale and
an electronic processor coupled to the load cell and configured to:
initiate a powerup zeroing function for the scale upon receiving an activation command activating the scale;
receive, from the load cell, a first signal indicative of a force applied to the platform of the scale;
determine whether the force applied to the platform of the scale exceeds a threshold upon receiving the first signal;
cancel the powerup zeroing function and calculate a weight based on the first signal upon determining that the force exceeds the threshold; and
calculate a weight based on the first signal and complete the powerup zeroing function upon determining that the force does not exceed the threshold.

2. The system of claim 1, wherein the electronic processor is further configured to complete the powerup zeroing function, by setting a zero point voltage for the load cell based on the first signal.

3. The system of claim 1, wherein the electronic processor is further configured to display, via a human machine interface, a zeroing override indication upon determining that the force exceeds the threshold.

4. The system of claim 1, wherein the electronic processor is further configured to:
check, within a memory, whether an auto-zero override flag is set; and
to cancel the powerup zeroing function only in response to both the force exceeding the threshold and the auto-zero override flag being set.

5. The system of claim 1, wherein the electronic processor is further configured to cancel the powerup zeroing function only when the force applied to the platform exceeds the threshold for a predetermined period of time.

6. The system of claim 1, wherein activating the scale includes powering on the scale.

7. The system of claim 1, wherein activating the scale includes waking the scale from a sleep mode.

8. The system of claim 1, wherein the electronic processor is further configured retrieve, from a memory, a previously stored zero point value and to calculate the weight based on the previously stored zero point value.

9. The system of claim 1, wherein the electronic processor is further configured to:
determine whether the force applied to the platform of the scale exceeds an error threshold upon determining that the force does not exceed the threshold; and
cancel the powerup zeroing function and display, via a human machine interface, an error indication upon determining that the force exceeds the error threshold.

10. A method for controlling a scale, the method comprising:
    initiating a powerup zeroing function upon receiving an activation command activating the scale;
    receiving, from a load cell of the scale, a first signal indicative of a force applied to a platform of the scale;
    determining whether the force applied to the platform of the scale exceeds a threshold upon receiving the first signal; and
        cancelling the powerup zeroing function and calculating a weight based on the first signal upon determining that the force exceeds the threshold.

11. The method of claim 10, the method further comprising:
    completing the powerup zeroing function upon determining that the force does not exceed the threshold.

12. The method of claim 11, wherein completing the powerup zeroing function includes setting a zero point voltage for the load cell based on the first signal.

13. The method of claim 10, the method further comprising:
    displaying, via a human machine interface, a zeroing override indication.

14. The method of claim 10, the method further comprising:
    checking, within a memory, whether an auto-zero override flag is set; and
    cancelling the zeroing function only in response to both the force exceeding the threshold and the auto-zero override flag being set.

15. The method of claim 10, wherein the powerup zeroing function is only cancelled when the force applied to the threshold exceeds the threshold for a predetermined period of time.

16. The method of claim 10, wherein activating the scale includes powering on the scale.

17. The method of claim 10, wherein activating the scale includes activating the scale includes waking the scale from a sleep mode.

18. The method of claim 10, the method further comprising:
    retrieving, from a memory, a previously stored zero point value; and
    calculating the weight based on the previously stored zero point value.

19. The method of claim 10, the method further comprising:
    determining whether the force applied to the platform of the scale exceeds an error threshold upon determining that the force does not exceed the threshold; and
    cancelling the powerup zeroing function and displaying, via a human machine interface, an error indication upon determining that the force exceeds the error threshold.

20. An electronic scale comprising:
    a memory,
    a load cell coupled to a platform of the scale, and
    an electronic processor coupled to the memory and the load cell and configured to:
    retrieve a voltage value from the load cell;
    retrieve, from the memory, a previously stored zero point value for the load cell;
    compare the voltage value to the previously stored zero point value;
    increment a drift counter upon determining that the voltage value differs from the previously stored zero point value by more than a drift threshold;
    set the zero point value for the load cell based on the voltage value upon determining that the drift counter exceeds a threshold value.

21. The electronic scale of claim 18, wherein the electronic processor is further configured to:
    determine whether the voltage value differs from the previously stored zero point value by less than a fluctuation threshold; and
    set the zero point value for the load cell based on the voltage value only when the voltage value differs from the previously stored zero point value by more than the drift threshold and less than the fluctuation threshold.

22. The electronic scale of claim 18, wherein the electronic processor is further configured to:
    determine whether a drift interval period has expired upon determining that the drift counter exceeds a threshold value; and
    set the zero point value for the load cell based on the voltage value only when the drift interval period has not expired.

* * * * *